(12) United States Patent
King (10) Patent No.: US 7,897,919 B2
(45) Date of Patent: *Mar. 1, 2011

(54) METHOD AND SYSTEM FOR THERMAL IMAGING HAVING A SELECTIVE TEMPERATURE IMAGING MODE

(75) Inventor: John H. King, Cynthiana, KY (US)

(73) Assignee: E.D. Bullard Company, Cynthiana, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,951

(22) Filed: Sep. 28, 2009

(65) Prior Publication Data

US 2010/0012840 A1    Jan. 21, 2010

Related U.S. Application Data

(63) Continuation of application No. 11/766,986, filed on Jun. 22, 2007, now Pat. No. 7,622,716, which is a continuation of application No. 11/134,186, filed on May 20, 2005, now Pat. No. 7,321,119.

(60) Provisional application No. 60/601,017, filed on Aug. 12, 2004.

(51) Int. Cl.
    *G02F 1/01*     (2006.01)
(52) U.S. Cl. ..................................... 250/330
(58) Field of Classification Search .................. 250/330
See application file for complete search history.

(56) References Cited

U.S. PATENT DOCUMENTS

| | | | | |
|---|---|---|---|---|
| 3,704,342 A | * | 11/1972 | Stoddard et al. | ............ 348/164 |
| 5,160,842 A | * | 11/1992 | Johnson | .................... 250/338.1 |
| 5,937,077 A | * | 8/1999 | Chan et al. | ................... 382/100 |
| 6,255,650 B1 | * | 7/2001 | Warner et al. | ................ 250/330 |
| 6,476,391 B1 | * | 11/2002 | Zhang | ......................... 250/330 |
| 6,606,115 B1 | * | 8/2003 | Alicandro et al. | ............ 348/164 |
| 6,696,958 B2 | * | 2/2004 | Anderson | .................... 340/578 |
| 6,787,775 B1 | * | 9/2004 | Bielefeld et al. | ............ 250/330 |
| 6,847,727 B1 | * | 1/2005 | Hahn | ......................... 382/104 |
| 6,849,849 B1 | * | 2/2005 | Warner et al. | ................ 250/330 |

OTHER PUBLICATIONS

European Patent Office, Summons to attend oral proceedings pursuant to Rule 115(1) EPC, issued in corresponding European application No. 05 792 931.7, Dec. 15, 2010, pp. 1-9.

* cited by examiner

*Primary Examiner*—David P Porta
*Assistant Examiner*—Mindy Vu
(74) *Attorney, Agent, or Firm*—Stites & Harbison, PLLC; David W. Nagle, Jr.; Jeffrey A. Haeberlin (57) ABSTRACT

The present invention is a method for operating a thermal imaging camera for selective temperature imaging, and a thermal imaging system having a selective temperature imaging mode. When first entering the selective temperature imaging mode of operation, the system and method automatically determine the hottest area in a scene and display it in a predetermined hue. The remainder of the scene is displayed in grayscale. The method and system allow further adjustment of the set point of the selective temperature imaging mode, and display portions of the scene as hot as or hotter than the set point value in gradient shades of the predetermined hue.

18 Claims, 8 Drawing Sheets

| 70°F | 70°F | 70°F | 70°F |
| --- | --- | --- | --- |
| 70°F | 70°F | 100°F | 70°F |
| 120°F | 120°F | 90°F | 90°F |
| 70°F | 70°F | 90°F | 90°F |

METHOD AND SYSTEM FOR THERMAL IMAGING HAVING A SELECTIVE TEMPERATURE IMAGING MODE

CROSS-REFERENCE TO RELATED APPLICATIONS

This application is a continuation of U.S. patent application Ser. No. 11/766,986, filed on Jun. 22, 2007, which itself is a continuation of U.S. patent application Ser. No. 11/134,186, filed on May 20, 2005, now U.S. Pat. No. 7,321,119, which claims the benefit of U.S. Provisional Application No. 60/601,017, filed on Aug. 12, 2004, the entire disclosures of which are incorporated herein by reference.

BACKGROUND OF THE INVENTION

The present invention relates to a portable thermal imaging camera, a device that is commonly used by firefighters and other rescue personnel to identify the seat of a fire from outside of a burning structure, to identify fire conditions within a burning structure hidden by heavy smoke, and/or to identify victims trapped within a burning structure.

Modern thermal imaging cameras, also referred to as thermal imagers, were introduced to firefighters in the mid-1990's. Originally developed for military applications, thermal imaging cameras quickly proved to be a valuable firefighting tool, essentially allowing firefighters to "see" in dark, smoke-filled and other extreme environments.

Thermal imaging cameras are now used by firefighters in numerous applications, including: to identify the seat of the fire from outside of a burning structure, thereby allowing the incident commander to determine what resources will be necessary and how to deploy such resources; to identify fire conditions and "hot spots" within a burning structure hidden by heavy smoke or building design features; and to identify victims trapped within a burning structure despite potentially blinding smoke conditions. Furthermore, thermal imaging cameras have been used to identify alternate egress routes for rapid and safe extraction of victims; to observe the impact of the water application on the heat and fire conditions; to identify areas within a burning structure with extremely high heat levels so such areas can be ventilated to reduce the chances of backdraft or flashover; to identify windows and doors in potentially blinding smoke conditions, thus allowing firefighters to rapidly vent a burning structure as they move through it; and to identify the movement of hazardous materials and identify product levels in containers within the burning structure.

Structurally, a portable thermal imaging camera includes several components that are contained in a housing designed to be carried by an individual, e.g., a firefighters First and foremost, the essential function of a thermal imaging camera is carried out by a sensor that reacts to thermal or infrared radiation, converting sensed thermal radiation (the "thermal picture") of a scene into a set of temperature values, or thermal image data. One common sensor used in portable thermal imaging cameras is a focal plane array ("FPA") type sensor, which has thousands of individual sensing elements. An example of a FPA type sensor is a microbolometer with a vanadium oxide (VOx) or an amorphous silicon sensing material.

A second component is a lens which focuses the infrared radiation from the scene onto the sensor. The quality of the lens is a major factor in the quality of the resultant thermal image data. One measure of quality is the f-number. A bigger lens means a smaller f-number and increased image quality. Of course, the size of the lens is limited by weight and costs considerations. For this reason, a common lens provides an f/stop of 1.0, and a common material for lens construction is germanium.

Another component is a thermal imaging engine, which processes the thermal image data to produce a thermal image. The thermal imaging engine may be a digital signal processor (DSP) or the equivalent. Generally, the thermal imaging engine will produce an image where hotter temperatures appear lighter, and cooler temperatures appear darker, such as with a grayscale imaging scheme. Additionally, the thermal imaging engine may provide "hot" colorization, where the hottest temperatures appear, progressively, in yellow, orange and red colors, and the cooler temperatures remain in the grayscale imaging scheme. For instance, "hot" colorization may be provided for temperatures above 500° F.

Yet another component is a display, the means by which the resultant thermal image is provided to the user. An active matrix liquid crystal display ("LCD") is commonly used in portable thermal imaging cameras. The video display is commonly contained within the housing and viewable through a display window secured to the housing.

Again, each of the above-described components is contained within (or otherwise secured to) a common housing. The housing protects the delicate sensing components, and indeed protects such components in even severe fire conditions. At the same time, common housings are designed to facilitate transport. In this regard, some portable thermal imaging cameras are designed with a pistol grip that allows a firefighter to easily carry and aim the thermal imaging camera; others are provided with straps that allow the thermal imaging camera to be raised to the eyes much like binoculars.

In the early development of thermal imaging cameras, there was a limited dynamic range in that, when using the camera in an environment with extremely high temperatures, such as those encountered in a structure fire, the sensor would become saturated. As a result, it was difficult to identify fire conditions and "hot spots" in the thermal image with much precision. To overcome this problem, some thermal imaging cameras were provided with a user-operated mechanical iris that allowed for some regulation of the thermal energy reaching the sensor by changing the aperture of the lens. In other words, a user could artificially adjust the dynamic range (spread of temperatures) of the thermal image. This allowed the user to control the viewed image so that only "objects of interest" (the hottest items) showed up on the display.

Later advances in the sensors for thermal imaging cameras extended the dynamic range significantly, substantially eliminating the need for mechanical irises. However, a feature which allows the user to control the viewed image so that only objects of interest are highlighted on the display remains a desirable feature. More particularly, a selective temperature imaging feature that does not conflict with the normal "colorization" features of modem thermal imaging cameras is desired in firefighting overhaul and size-up operations. For instance, it is desired that such a selective temperature imaging feature allow a user to scan a large area, such as the inside of a department store, and automatically identify the hottest portion of the resultant image (e.g., an overheated light fixture) without knowing the location of the "hot spot" or its temperature. In order to prevent interference with the fixed "hot" colorization (yellow, orange, red) ranges, it is desired that the selective, or variable, temperature imaging feature highlight the hottest portion of the resultant image in an alternate colorization while the remaining portions of the image are displayed in a normal grayscale representation.

BRIEF SUMMARY OF THE INVENTION

The method and system of the invention meets these needs, and others, by providing a selective temperature imaging mode of operation. When first entering the selective temperature imaging mode of operation, the method and system automatically determines the hottest area in the scene and displays it in a predetermined hue. The remainder of the scene is displayed in grayscale. Advantageously, the method and system of the invention further allows adjustment of the set point of the selective temperature imaging mode, and displays portions of the scene as hot as or hotter than the set point value in gradient shades of the predetermined hue.

Generally described, a thermal imaging system having a selective temperature imaging mode, according to one aspect of the invention, has: a thermal sensing component for acquiring thermal image data for a scene; an input for receiving a command to enter a selective temperature imaging mode; a thermal imaging engine; and a display component for displaying a thermal image. The thermal imaging engine is for: analyzing the thermal image data to determine a highest temperature in the scene in response to receiving a command to enter a selective temperature imaging mode from the input; and generating the thermal image from the thermal image data where the highest temperature portions of the image are assigned a predetermined hue, and the remaining portions of the image are assigned grayscale values.

According to another aspect of the invention, the thermal imaging engine establishes a set point value at the highest temperature in the scene, and then calculates the set point value as a percentage value with respect to an operating range for the selective temperature imaging mode. The percentage value is then displayed on the display component.

According to yet another aspect of the invention, the thermal sensing component acquires updated thermal image data, and the thermal imaging engine generates a new thermal image from the updated thermal image data where the portions of the thermal image corresponding to temperature values greater than or equal to the set point value are assigned gradient shades of the predetermined hue, and the remaining portions of the thermal image are assigned grayscale values.

In accordance with another aspect of the invention, the system further has an input for receiving a command to change the set point value, and an input for receiving a command to exit the selective temperature imaging mode. The thermal imaging engine updates the set point value to a new set point in response to receiving a command to change the set point value, and exits the selective temperature imaging mode in response to receiving an exit command. Preferably, the input for receiving a command to change the set point value includes a first momentary contact switch for receiving a command to reduce the set point value, and a second momentary contact switch for receiving a command to increase the set point value. Advantageously, the first momentary contact switch may also act as the input for receiving a command to enter the selective temperature imaging mode, since the reduce set point function is only operative after the enter selective temperature imaging mode function has been completed. Further, the first and secondary momentary contact switches may be utilized jointly as an input device for receiving the exit command by including additional means for detecting whether both switches have been activated simultaneously for a predetermined period of time, such as one second.

No limitations on the invention should be taken from the preceding summary, as it is merely intended to summarize the various aspects of the invention. The invention will be better understood by reference to the following detailed description and the appended drawings and claims.

DETAILED DESCRIPTION OF EXEMPLARY EMBODIMENTS OF THE INVENTION

The present invention is a method for operating a thermal imaging camera for selective temperature imaging, and a thermal imaging system having a selective temperature imaging mode.

Figure 1:
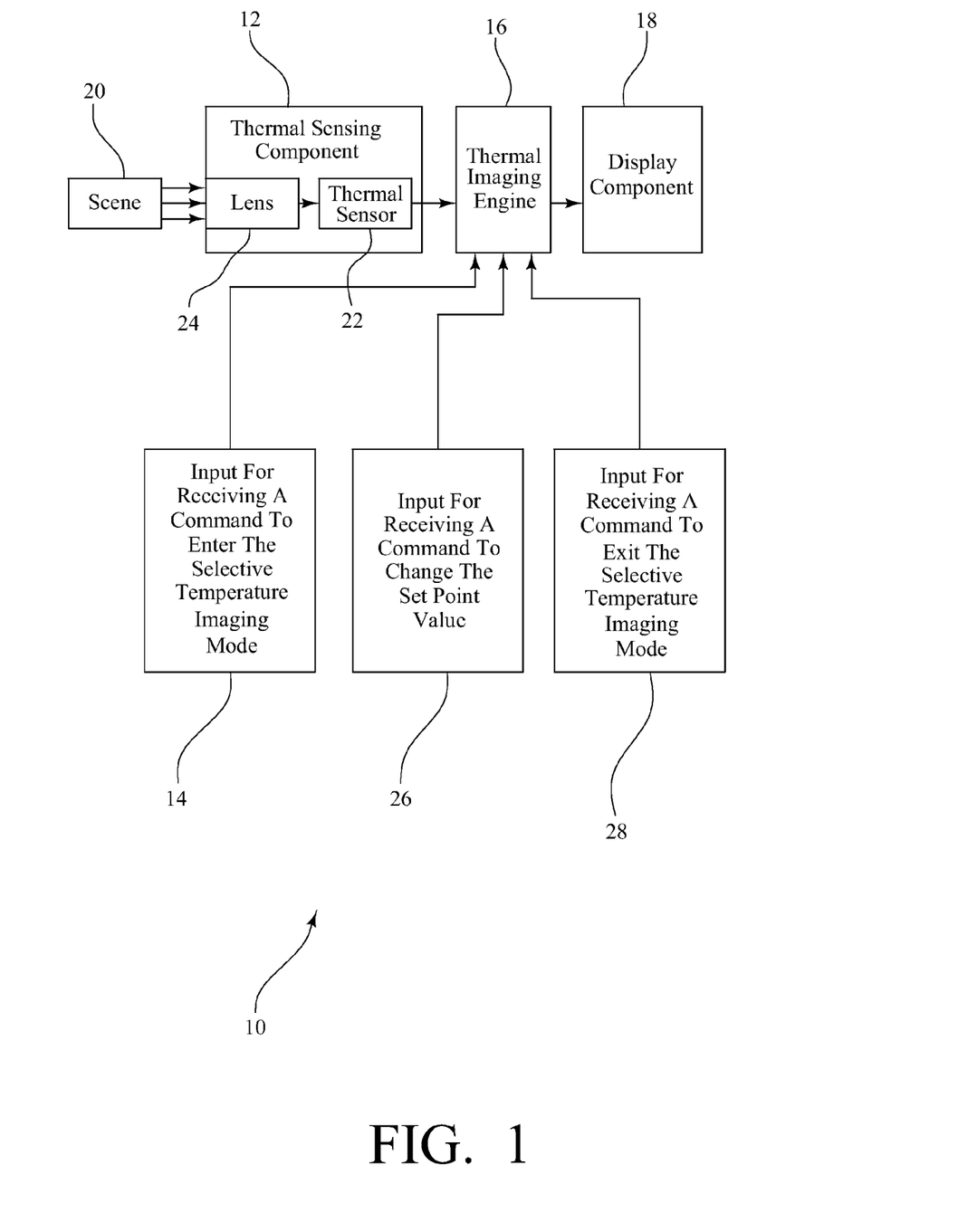
FIG. 1 is a functional block diagram of a thermal imaging system having a selective temperature imaging mode, according to the invention.

FIG. 1 is a block diagram of an exemplary thermal imaging system 10 having a selective temperature imaging mode according to the invention. The exemplary thermal imaging system generally includes a thermal sensing component 12, an input 14 for receiving a command to enter a selective temperature imaging mode, a thermal imaging engine 16, and a display component 18. In normal use, the thermal sensing component 12 acquires thermal image data for a scene 20, the thermal imaging engine 16 processes the thermal image data to produce a thermal image having "hot colorization", as described above, and the thermal image is then displayed on the display component 18. Preferably, the thermal sensing component 12 has a thermal sensor 22 and a lens 24 for focusing infrared radiation from the scene 20 onto the thermal sensor 22. Additionally, the exemplary thermal imaging system has an input 26 for receiving a command to change a set point value, and an input 28 for receiving a command to exit the selective temperature imaging mode.

Figure 2:
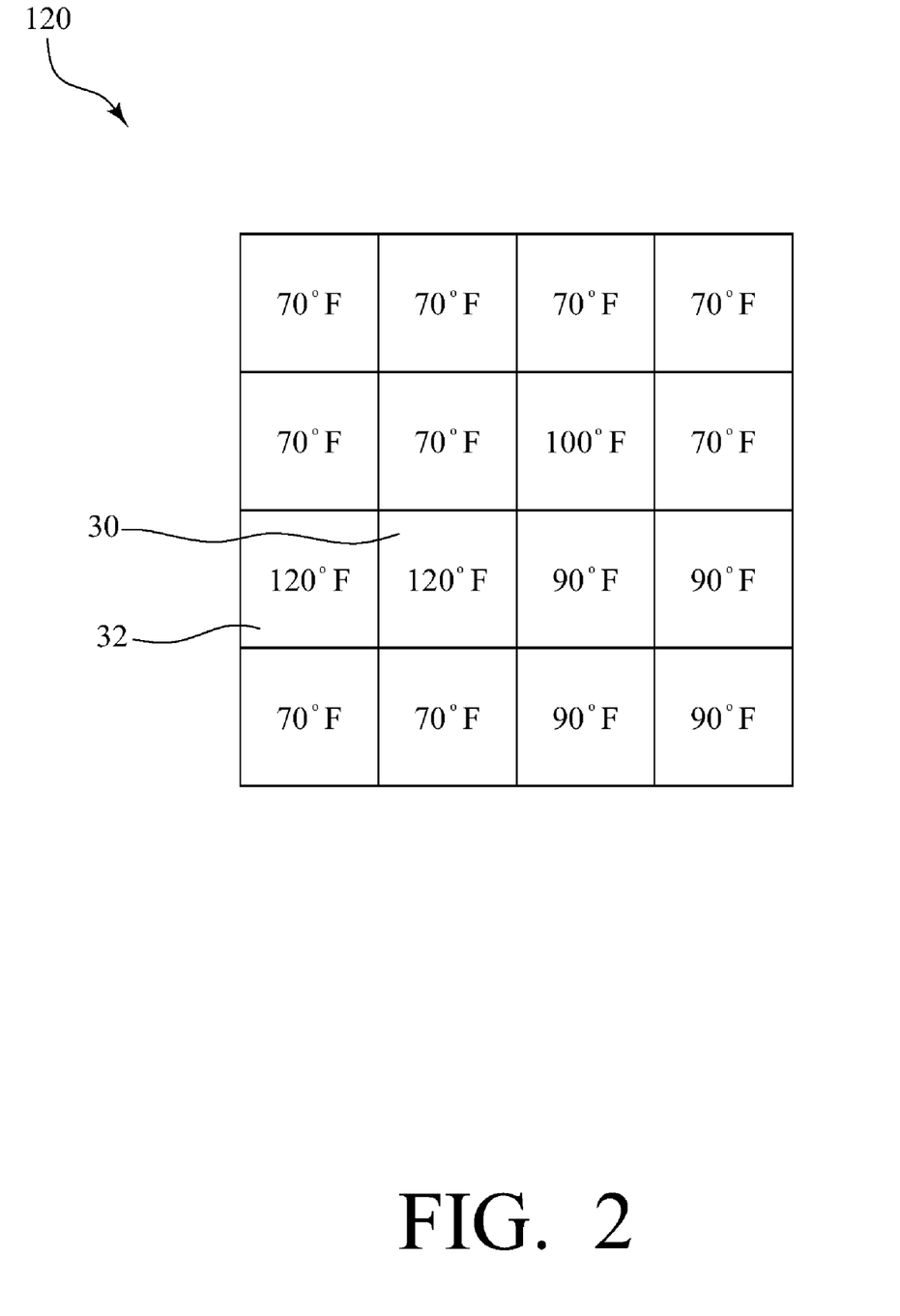
FIG. 2 is an illustration of a simple thermal scene, as might be captured by a thermal sensor having a 4-pixel by 4-pixel focal plane array type sensor.

In operation, the thermal sensing component 12 acquires thermal image data for the scene 20. A thermal scene 120 is shown in FIG. 2 as a simple 4×4 temperature grid. In practice, of course, much higher resolution would be required to accurately depict a typical thermal scene, such as of the inside of a department store. However, the simplified thermal scene of FIG. 2 is adequate to illustrate the principles of the invention. The thermal scene 120 shown has a highest temperature portion consisting of the two grid blocks 30, 32 at 120° F. The thermal sensing component could capture the thermal scene as thermal image data using a 4-pixel by 4-pixel (4×4) FPA sensor.

Upon receipt of a command to enter a selective temperature imaging mode, the thermal imaging engine 16 will analyze the thermal image data to determine a highest temperature in the thermal image data (120° F. in this example). One preferred input 14, or input device, for the command to enter the thermal selective temperature imaging mode is a momentary contact switch. Then, the thermal imaging engine 16 will generate a thermal image from the thermal image data where the highest temperature portions of the image are assigned a predetermined hue, and the remaining portions of the image are assigned shades of gray, or grayscale values. To distinguish from the fixed "hot colorization" ranges described above, the predetermined hue may be selected, or predetermined, as an alternate color or hue, such as blue. Additionally, any hot colorization features would be turned off, to eliminate any conflict between the hot colorization and the selective temperature imaging mode alternate colorization. The display component 18 then displays the thermal image.

Figure 3:
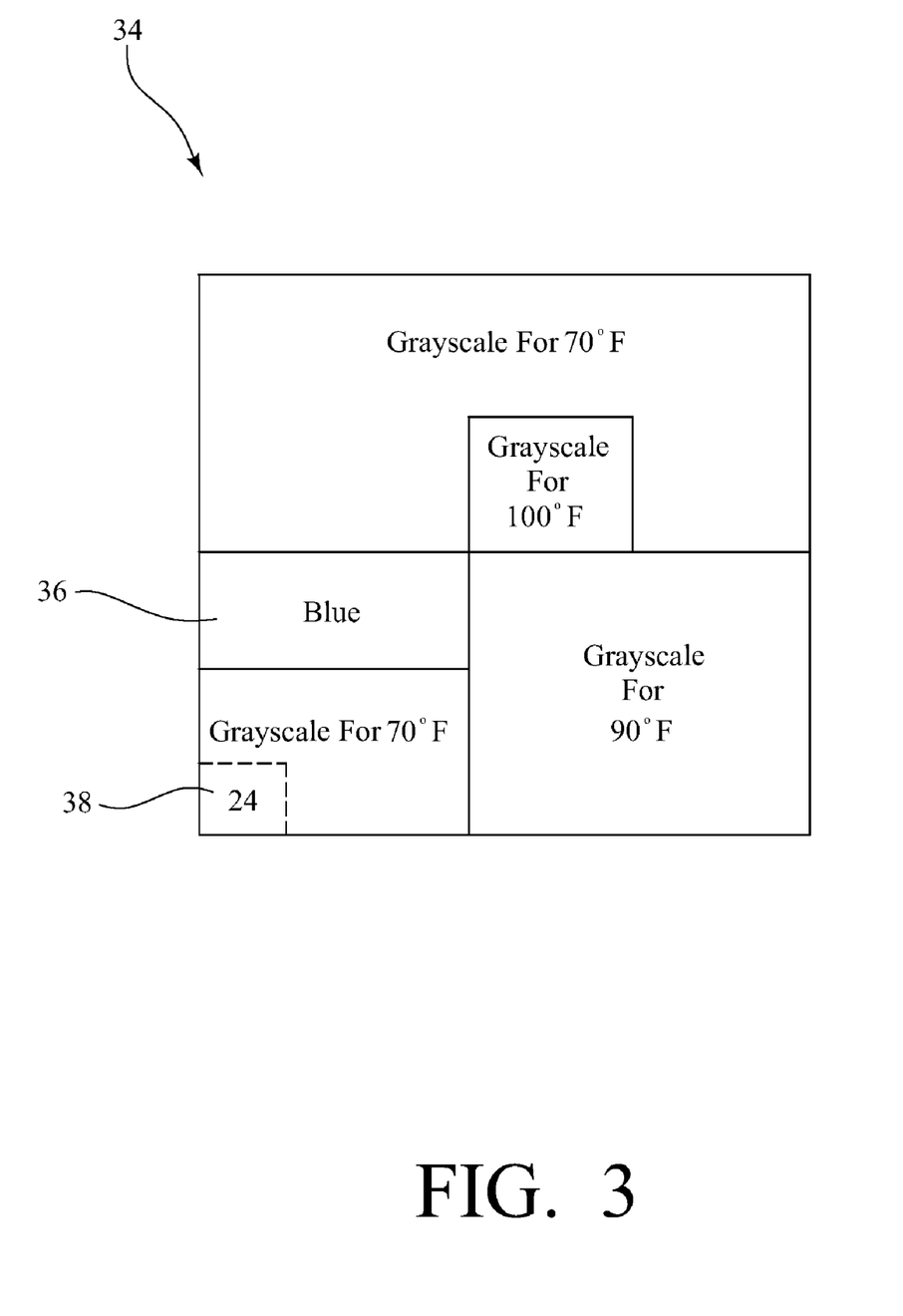
FIG. 3 is an illustration of a thermal image display generated by a method and system according to the invention for the thermal scene of FIG. 2.

FIG. 3 shows a thermal image display 34 that would be generated for the thermal scene 120 of FIG. 2, where the highest temperature portion 36 of the thermal image is assigned the predetermined hue (blue in this example), and the remaining portions of the image are assigned grayscale values corresponding to the thermal image data for each portion. Thus, the selective temperature imaging feature allows a user to acquire an image of the thermal scene 120 and automatically identify the highest temperature portion 36 of the resultant image without knowing the location of the hot portion or its temperature.

Further, in the exemplary embodiment described herein, the selective temperature imaging mode has an operating range, such as zero to 500° F. Then, the thermal imaging engine 16 will also calculate the highest temperature in the scene as a percentage value of the operating range, and superimpose the percentage value 38 over a portion of the thermal image. Preferable, the percentage value 38 is positioned in a peripheral location, such as the percentage value 38 in the lower-left corner of the display, as shown in FIG. 3. Thus, assuming an operating range of 0 to 500° F., the highest temperature value of 120° F. represents twenty-four percent of the operating range.

To allow the user to view thermal images of areas other than the original scene, the thermal imaging engine may continually acquire new thermal image data for whatever thermal scene is "seen" by the thermal sensing component 12. To allow continued operation in the selective temperature imaging mode, the thermal imaging engine 16 will establish a set point value at the highest temperature in the original scene. Then, when each new set of thermal image data is acquired, the thermal imaging engine 16 will generate a new thermal image where the portions of the thermal image corresponding to temperature values greater than or equal to the set point value will be emphasized in the predetermined hue. Preferably, the thermal imaging engine 16 will assign gradient shades of the predetermined hue to the portions of the image that are as hot or hotter than the set point value, so that the image will retain contrast between various temperature zones and aid in the differentiation of objects in the scene.

As an additional aid to operation in the selective temperature imaging mode, the thermal imaging engine may have an input 26 for receiving a command to change the set point value. The thermal imaging engine 16 will then update (raise or lower) the set point value to a new set point in response to receiving a command to change the set point value from the input 26, and assign gradient shades of the predetermined hue to the portions of the image that are as hot or hotter than the new set point value.

Figure 4:
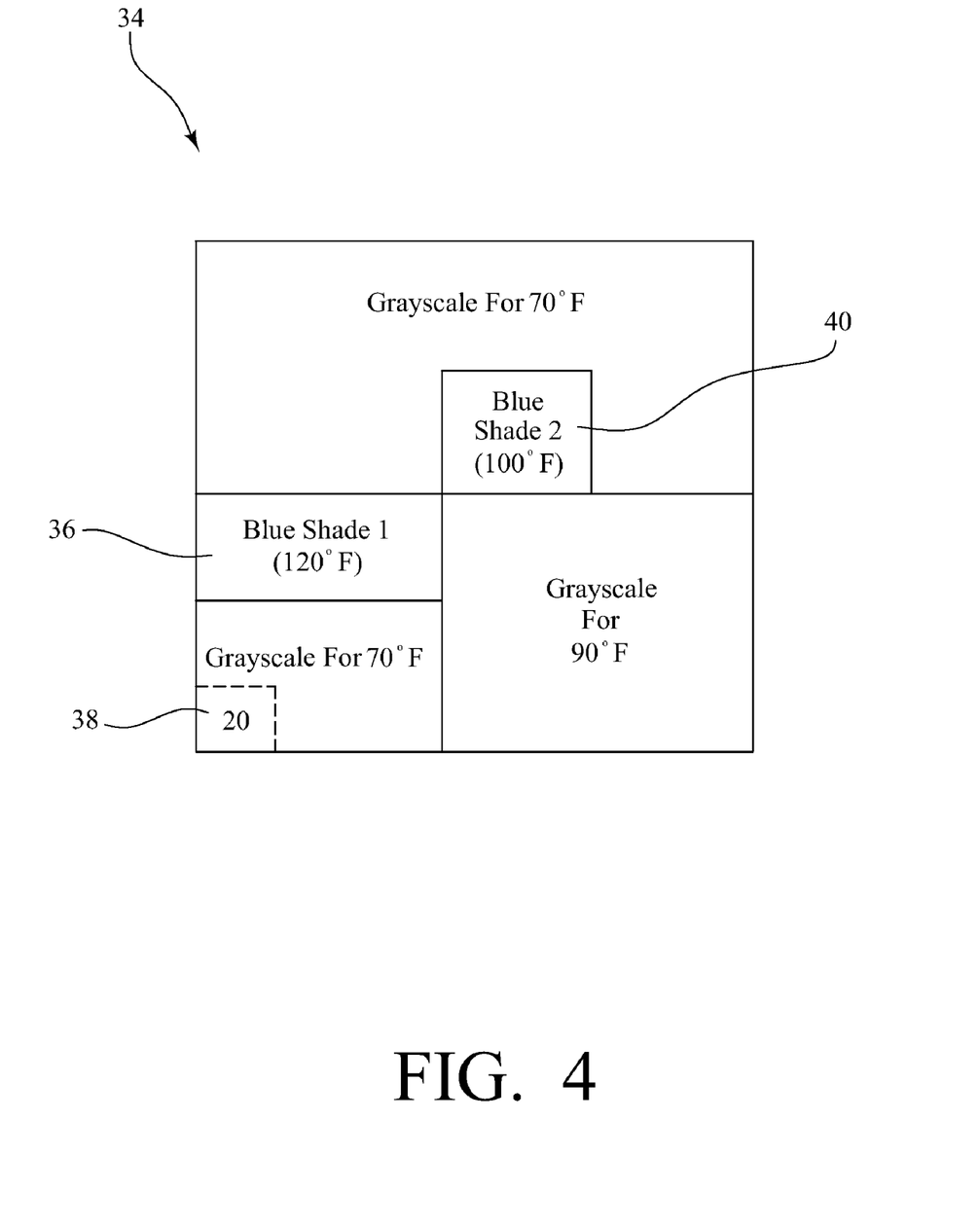
FIG. 4 is an illustration of another thermal image display generated by a method and system according to the invention for the thermal scene of FIG. 2.

FIG. 4 shows a thermal image display 34 that would be generated for the thermal scene of FIG. 2, where the user has lowered the set point to 100° F. Thus, the portion of the image corresponding to a temperature of 120° F. 36 is displayed in a first shade of blue, and the portion of the image corresponding to a temperature of 100° F. 40 is displayed in a second shade of blue. Preferably, the second shade of blue is lighter than the first shade of blue. The remaining portions of the image are assigned grayscale values corresponding to the thermal image data for each portion. Additionally, the percentage value 38 is updated to reflect a set point of 100° F., which is twenty percent of the temperature range.

Figure 5:
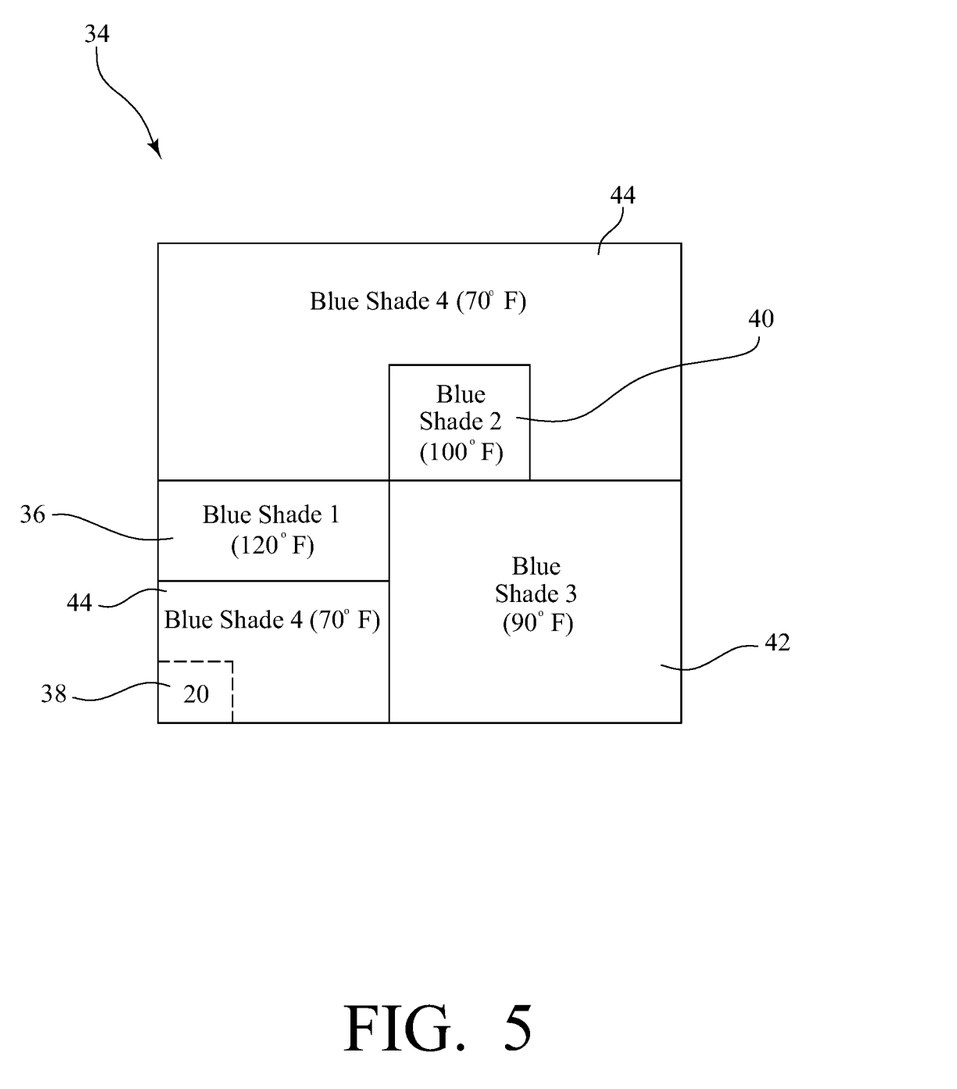
FIG. 5 is an illustration of another thermal image display generated by a method and system according to the invention for the thermal scene of FIG. 2.

FIG. 5 shows a thermal image display that would be generated for the thermal scene of FIG. 2, where the user has lowered the set point to 70° F., such that the portion of the image corresponding to a temperature of 90° F. 42 is displayed in a third shade of blue, and the portion of the image corresponding to a temperature of 70° F. 44 is displayed in a fourth shade of blue. Thus, the entire scene is displayed in differing shades of blue. The percentage value 38 is updated to reflect a set point of 70° F., which is fourteen percent of the temperature range.

The input 26 for receiving the user command to change the set point value may be a first momentary contact switch for receiving a command to reduce the set point value and a second momentary contact switch for receiving a command to increase the set point. Advantageously, the first momentary contact switch may function both as the input device for receiving the command to enter the selective temperature imaging mode and as the input device for receiving a command to reduce the set point value, since the second function would be operative only after the first function was completed. Further, the first and second momentary contact switches may include additional means, such as through a software interface, whereby a quick push of either of the switches will step the set point in small increments, such as one degree F, while holding the switch down will gradually increase the stepping increment to larger values, such as up to about 100° F. per second.

Alternatively, the input 26 for receiving the user command to change the set point value may be a rheostat style switch, a series of switch buttons, or any other functionally equivalent device.

Additionally, the thermal imaging engine 16 may have an input 28 for receiving a command to exit the selective temperature imaging mode. The thermal imaging engine 16 will then exit the selective temperature imaging mode in response to receiving an exit command, and return to normal operation where the thermal image is presented in grayscale with fixed hot colorization. If the configuration using first and second momentary contact switches described above is utilized, the switches may advantageously be utilized jointly as the input 28 for receiving the exit command by including additional means, such as a software interface, for detecting whether both switches are activated simultaneously for a predetermined period of time, such as one second.

Figure 6:
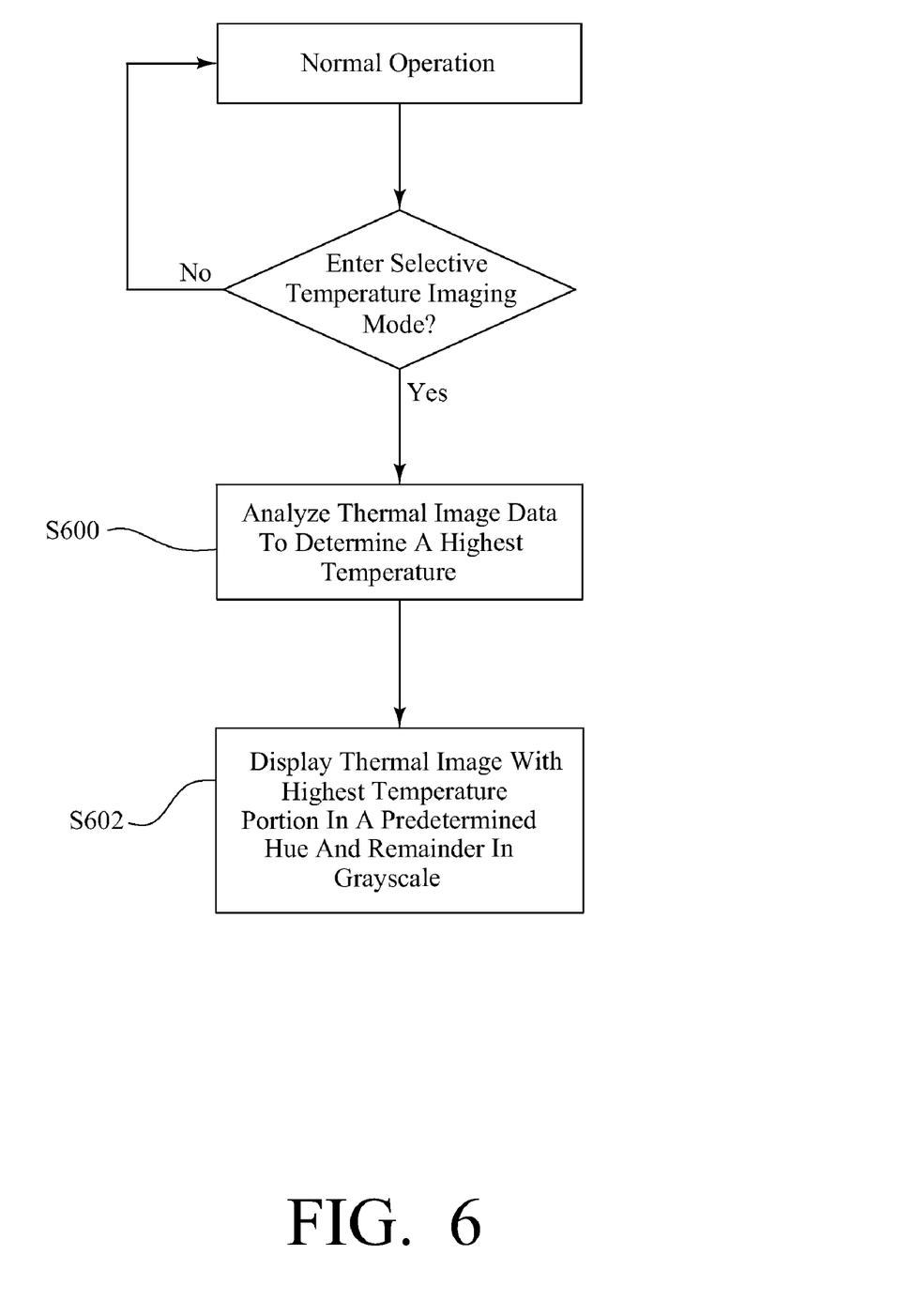
FIG. 6 is a logic flow diagram for an exemplary method of operating a thermal imaging camera for selective temperature imaging, according to the invention.

FIG. 6 is a logic flow diagram of an exemplary method of operating a thermal imaging camera for selective temperature imaging, including the steps of: S600 analyzing thermal image data for a scene to determine a highest temperature in said scene in response to receiving a command to enter a selective temperature imaging mode; and S602 displaying a thermal image of said scene with the highest temperature portions of the image in a predetermined hue and the remainder of the image in grayscale, such that the highest temperature portions of the thermal image are selectively highlighted in said predetermined hue in contrast to the grayscale display of the remaining portions of the thermal image.

Figure 7:
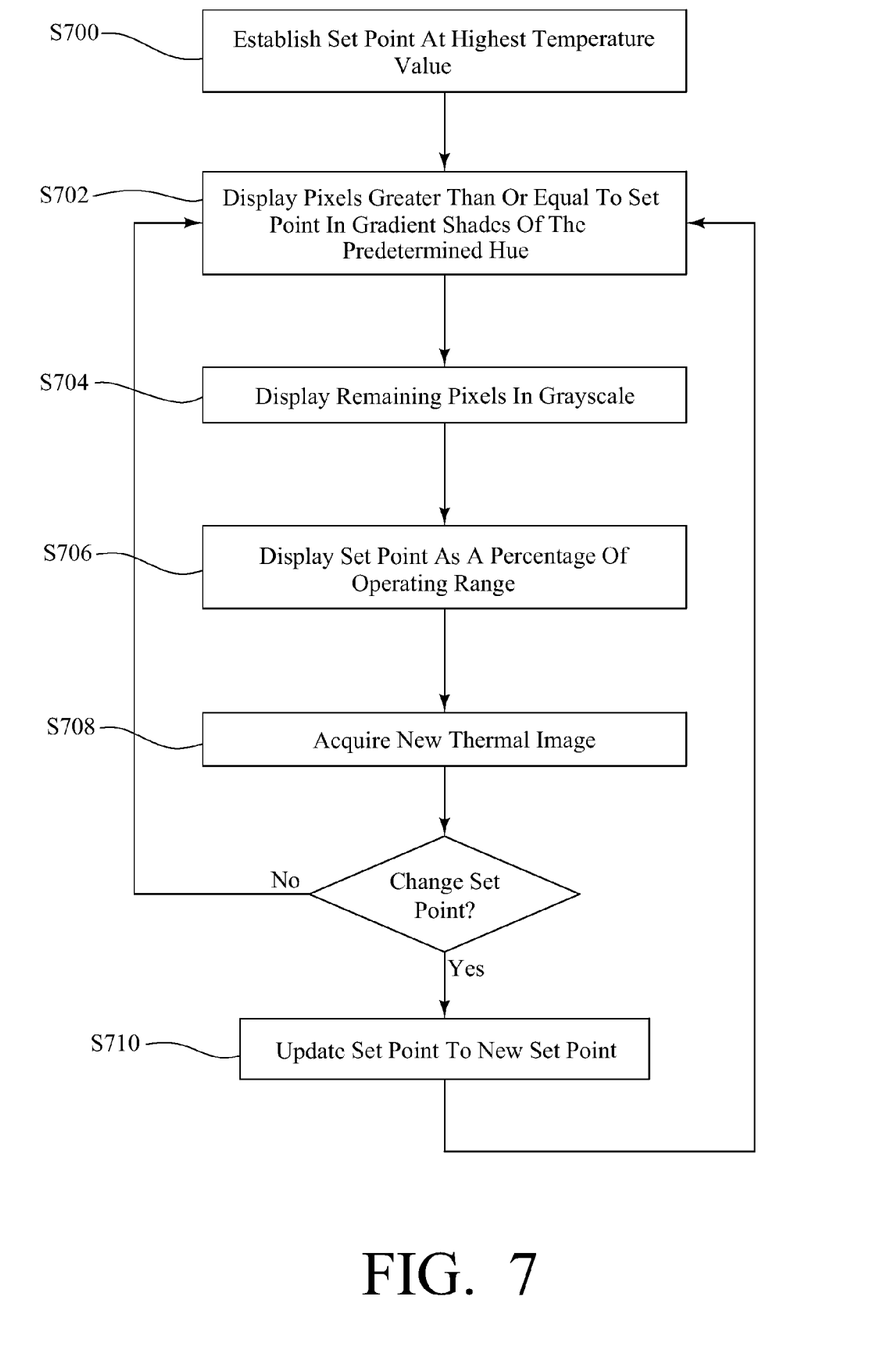
FIG. 7 is a logic flow diagram of additional steps in the exemplary method of FIG. 6.

FIG. 7 is a logic flow diagram of additional steps of the exemplary method of FIG. 6, including the steps of: S700 establishing a set point value at the highest temperature in the scene; S702 displaying the image portions corresponding to temperature values equal to said set point in said predetermined hue; S704 displaying the remaining image portions in grayscale; S706 displaying the set point value as a percentage value with respect to the operating range; S708 acquiring new thermal image data; and S710 updating the set point value to a new set point value in response to receiving a command to change the set point value.

Figure 8:
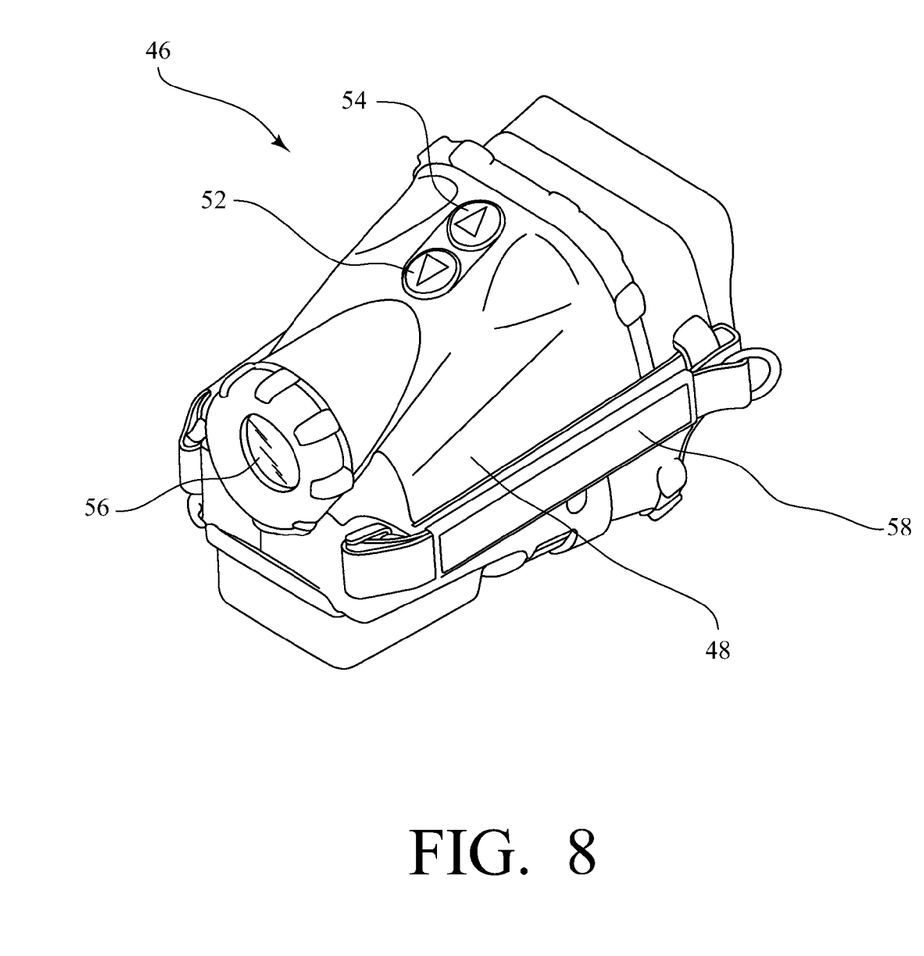
FIG. 8 is a perspective view of a thermal imaging camera having a selective temperature imaging mode, according to the invention.

FIG. 8 is a perspective view of an exemplary thermal imaging camera 46 having a selective temperature imaging mode, according to the invention. Shown are: a housing 48; a down momentary contact switch button 52 positioned on the housing 48; and an up momentary contact switch button 54 positioned on the housing 48. Not shown because they are contained within the housing are: a lens, a thermal sensor; a thermal imaging engine; and a display. The thermal sensor is for acquiring thermal image data for a scene. The lens is for focusing infrared radiation onto the sensor. The thermal imaging engine is for analyzing the thermal image data to determine a highest temperature in the scene in response to receiving a command to enter a selective temperature imaging mode via the down momentary contact switch button 52, and generating a thermal image from the thermal image data where the highest temperature portions of the image are a predetermined hue and the remaining portions of the image are grayscale. The display is viewable through transparent area on the back of the housing 48. The display is for displaying the thermal image. In operation, all of the components of the exemplary thermal imaging camera 46 function as described above.

Advantageously, the housing 48 may be made of a thermoplastic material. The thermal sensor may be an uncooled, microbolometer type, amorphous silicon sensor having a 160×120 array resolution. The dynamic range of the thermal imaging engine is approximately 1100° F. The normal operating range of the selective temperature imaging mode is preferably zero to 500° F., which is believed to be the range in which the function will best serve the needs of the potential users. Preferably, the thermal imaging engine is a digital signal processor. The thermal imaging engine processes thirty thermal images per second received from the thermal sensor, and outputs the corresponding thermal images to the display in NTSC, PAL or VGA formats. The display is a 3.5 inch diagonal, TFT active matrix, liquid crystal display (LCD) having a fluorescent lamp back light. The exemplary thermal imaging camera 46 is preferably powered by batteries, such that the camera 46 is portable. The lens is a 5 mm germanium lens having a fixed focus of 3 feet to infinity and a speed of f/1.0. The housing has a polycarbonate display window over the display and, additionally, has a germanium lens window 56 to protect the lens. A strap 58 may be provided to facilitate easy handling of the camera 46.

One of ordinary skill in the art will recognize that additional configurations and steps are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A thermal imaging system having a fixed hot colorization mode and a selective temperature imaging mode, said system comprising:
    a thermal sensing component for continually acquiring thermal image data for a scene;
    a first input for receiving a command to exit said fixed hot colorization mode and enter said selective temperature imaging mode, said fixed hot colorization mode having fixed temperature ranges wherein portions of thermal images corresponding to said fixed temperature ranges are displayed in predetermined colors, said selective temperature imaging mode having a set point value wherein portions of thermal images corresponding to temperatures higher than the set point value are displayed in an alternate color and portions of said images corresponding to temperatures less than said set point value are displayed in a grayscale representation, the set point value being incrementally adjustable;
    a second input for receiving a command to change the set point value;
    a thermal imaging engine for:
        generating thermal images in said selective temperature imaging mode from said thermal image data in response to receiving a command to exit said fixed hot colorization mode and enter said selective temperature imaging mode from said first input;
        incrementally changing the set point value to a new desired set point value in response to receiving a command to change the set point value from said second input; and
        generating thermal images from said thermal image data wherein portions of said images corresponding to temperatures higher than said new desired set point value are displayed in said alternate color and portions of said images corresponding to temperatures less than said new set point value are displayed in the grayscale representation; and
    a display component for displaying said thermal images.

2. The thermal imaging system of claim 1, further comprising a third input for receiving a command to exit the selective temperature imaging mode, wherein said thermal imaging engine is further for exiting the selective temperature imaging mode in response to receiving a command to exit the selective temperature imaging mode from said third input.

3. The thermal imaging system of claim 2, wherein said second input is a first momentary contact switch for receiving a command to reduce the set point value, and a second momentary contact switch for receiving a command to increase the set point value.

4. The thermal imaging system of claim 3, wherein at least one of said first momentary contact switch and said second momentary contact switch also functions as said first input.

5. The thermal imaging system of claim 3, wherein simultaneous activation of said first momentary contact switch and said second momentary contact switch for a predetermined period of time serves as said third input.

6. The thermal imaging system of claim 3, wherein activation of one of said first momentary contact switch and said second momentary contact switch for a first time period changes the set point value at a first rate, and wherein activation of one of said first momentary contact switch and said second momentary contact switch for longer time periods changes the set point value at progressively higher rates.

7. A method of operating a thermal imaging camera for selective temperature imaging, comprising the steps of:

entering a selective temperature imaging mode in response to receiving a command to exit a fixed hot colorization mode and enter the selective temperature imaging mode, said fixed hot colorization mode having fixed temperature ranges wherein portions of thermal images corresponding to said fixed temperature ranges are displayed in predetermined colors, said selective temperature imaging mode having a set point value wherein portions of thermal images corresponding to temperatures higher than the set point value are displayed in an alternate color and portions of said images corresponding to temperatures less than said set point value are displayed in a grayscale representation, the set point value being incrementally adjustable;

displaying a thermal image of a scene in said selective temperature imaging mode;

incrementally changing the set point value to a new desired set point value in response to receiving a command to change the set point value; and displaying an updated thermal image of said scene, wherein portions of the image corresponding to temperatures higher than said new desired set point value are displayed in said alternate color and portions of the image corresponding to temperatures less than said new set point value are displayed in the grayscale representation.

8. The method of operating a thermal imaging camera of claim 7, further comprising the step of exiting the selective temperature imaging mode in response to receiving a command to exit the selective temperature imaging mode.

9. The method of operating a thermal imaging camera of claim 8, wherein said command to change the set point value is one of a momentary signal to reduce the set point value and a momentary signal to increase the set point value, wherein receipt of said command to change the set point value for a first time period changes the set point value at a first rate, and wherein receipt of said command to change the set point value for longer time periods changes the set point value at progressively higher rates.

10. A thermal imaging system having a selective temperature imaging mode, said system comprising:
  a thermal sensing component for continually acquiring thermal image data for a scene;
  a first input for receiving a command to enter said selective temperature imaging mode, said selective temperature imaging mode having a set point value wherein portions of thermal images corresponding to temperatures higher than the set point value are displayed in a selected color and portions of said images corresponding to temperatures less than the set point value are displayed in a grayscale representation;
  a second input for receiving a command to change the set point value;
  a thermal imaging engine for:
    generating thermal images in said selective temperature imaging mode from said thermal image data in response to receiving a command to enter said selective temperature imaging mode from said first input;
    incrementally changing the set point value to a new desired set point value in response to receiving a command to change the set point value from said second input; and
    generating thermal images from said thermal image data wherein portions of said images corresponding to temperatures higher than said new desired set point value are displayed in said selected color and portions of said images corresponding to temperatures less than said new set point value are displayed in the grayscale representation; and
  a display component for displaying said thermal images.

11. The thermal imaging system of claim 10, and further comprising a third input for receiving a command to exit the selective temperature imaging mode, wherein said thermal imaging engine is further for exiting the selective temperature imaging mode in response to receiving a command to exit the selective temperature imaging mode from said third input.

12. The thermal imaging system of claim 11, wherein said second input is a first momentary contact switch for receiving a command to reduce the set point value, and a second momentary contact switch for receiving a command to increase the set point value.

13. The thermal imaging system of claim 12, wherein at least one of said first momentary contact switch and said second momentary contact switch also functions as said first input.

14. The thermal imaging system of claim 12, wherein simultaneous activation of said first momentary contact switch and said second momentary contact switch for a predetermined period of time serves as said third input.

15. The thermal imaging system of claim 12, wherein activation of one of said first momentary contact switch and said second momentary contact switch for a first time period changes the set point value at a first rate, and wherein activation of one of said first momentary contact switch and said second momentary contact switch for longer time periods changes the set point value at progressively higher rates.

16. A method of operating a thermal imaging camera for selective temperature imaging, comprising the steps of:
  entering a selective temperature imaging mode in response to receiving a command to enter said selective temperature imaging mode, said selective temperature imaging mode having a set point value wherein portions of thermal images corresponding to temperatures higher than the set point value are displayed in a selected color and portions of said images corresponding to temperatures less than the set point value are displayed in a grayscale representation;
  displaying a thermal image of a scene in said selective temperature imaging mode;
  incrementally changing the set point value to a new desired set point value in response to receiving a command to change the set point value; and
  displaying an updated thermal image of said scene, wherein portions of the image corresponding to temperatures higher than said new desired set point value are displayed in said selected color and portions of the image corresponding to temperatures less than said new set point value are displayed in the grayscale representation.

17. The method of operating a thermal imaging camera of claim 16, and further comprising the step of exiting the selective temperature imaging mode in response to receiving a command to exit the selective temperature imaging mode.

18. The method of operating a thermal imaging camera of claim 17, wherein said command to change the set point value is one of a momentary signal to reduce the set point value and a momentary signal to increase the set point value, wherein receipt of said command to change the set point value for a first time period changes the set point value at a first rate, and wherein receipt of said command to change the set point value for longer time periods changes the set point value at progressively higher rates.

* * * * *